(12) United States Patent
Taljaard

(10) Patent No.: US 6,761,385 B2
(45) Date of Patent: Jul. 13, 2004

(54) CAVITY FORMED TUBE FOR A GRILL GUARD

(75) Inventor: Jan Adriaan Taljaard, Ga-Rankuwa (ZA)

(73) Assignee: Giflo Engineering (BOP) (PTY) LTD., Ga-Rankuwa (ZA)

(*) Notice: Subject to any disclaimer, the term of this patent is extended or adjusted under 35 U.S.C. 154(b) by 0 days.

(21) Appl. No.: 10/236,564

(22) Filed: Sep. 5, 2002

(65) Prior Publication Data

US 2003/0160465 A1 Aug. 28, 2003

Related U.S. Application Data

(60) Provisional application No. 60/359,480, filed on Feb. 25, 2002.

(51) Int. Cl.$^7$ .............................................. B60R 19/52
(52) U.S. Cl. ...................................... 293/115; 293/144
(58) Field of Search ................................. 293/115, 144; 180/68.6

(56) References Cited

U.S. PATENT DOCUMENTS

| | | | | |
|---|---|---|---|---|
| 1,683,283 A | * | 9/1928 | Bowman | 293/115 |
| D116,071 S | * | 8/1939 | Walklet | 293/144 |
| 2,190,328 A | * | 2/1940 | Hans | 293/115 |
| D154,744 S | * | 8/1949 | Browneye et al. | 293/115 |
| D157,426 S | * | 2/1950 | Poncher et al. | 293/115 |
| D159,392 S | * | 7/1950 | Poncher et al. | 293/115 |
| D161,455 S | * | 1/1951 | Jenkins | 293/115 |
| 2,580,775 A | * | 1/1952 | Helms et al. | 293/144 |
| 2,650,126 A | * | 8/1953 | Barnas | 293/115 |
| 2,650,840 A | * | 9/1953 | Poncher et al. | 277/621 |
| 2,687,912 A | * | 8/1954 | Beauchamp | 293/115 |
| 3,438,667 A | * | 4/1969 | Davis | 293/115 |
| 4,168,855 A | * | 9/1979 | Koch | 293/115 |
| 4,671,552 A | * | 6/1987 | Anderson et al. | 293/144 |
| 4,971,219 A | * | 11/1990 | Dombeck et al. | 220/303 |
| 5,277,465 A | * | 1/1994 | Weir | 293/144 |
| D343,817 S | * | 2/1994 | Morrow | D12/172 |
| 5,326,142 A | * | 7/1994 | Dodds et al. | 293/115 |
| 5,581,868 A | * | 12/1996 | Bisch | 29/525.08 |
| 5,683,128 A | * | 11/1997 | Heyns | 293/115 |
| D422,953 S | * | 4/2000 | Waagenaar | D12/171 |
| 6,290,271 B1 | * | 9/2001 | Geisler | 293/115 |
| 6,315,338 B1 | * | 11/2001 | Schneider et al. | 293/115 |
| D455,684 S | * | 4/2002 | McGuiness | D12/171 |
| 6,447,032 B1 | * | 9/2002 | Howell, Sr. | 293/115 |
| D471,846 S | * | 3/2003 | Pfeiffer et al. | D12/163 |

FOREIGN PATENT DOCUMENTS

GB    2 269 566    * 2/1994

* cited by examiner

Primary Examiner—Kiran Patel
(74) Attorney, Agent, or Firm—Lahive & Cockfield, LLP

(57) ABSTRACT

A grill guard for a motor vehicle comprises a plurality of horizontal formed tubes and a plurality of vertically extending connecting members for connecting together the plurality of tubes so as to define the grill guard. The end of each formed tube is curved, and is provided with a cap member that is integral with the formed tube. The cap member serves to substantially cover the circular aperture at the curved end of the tube, so as to provide a relatively more attractive and safer grill guard.

2 Claims, 2 Drawing Sheets

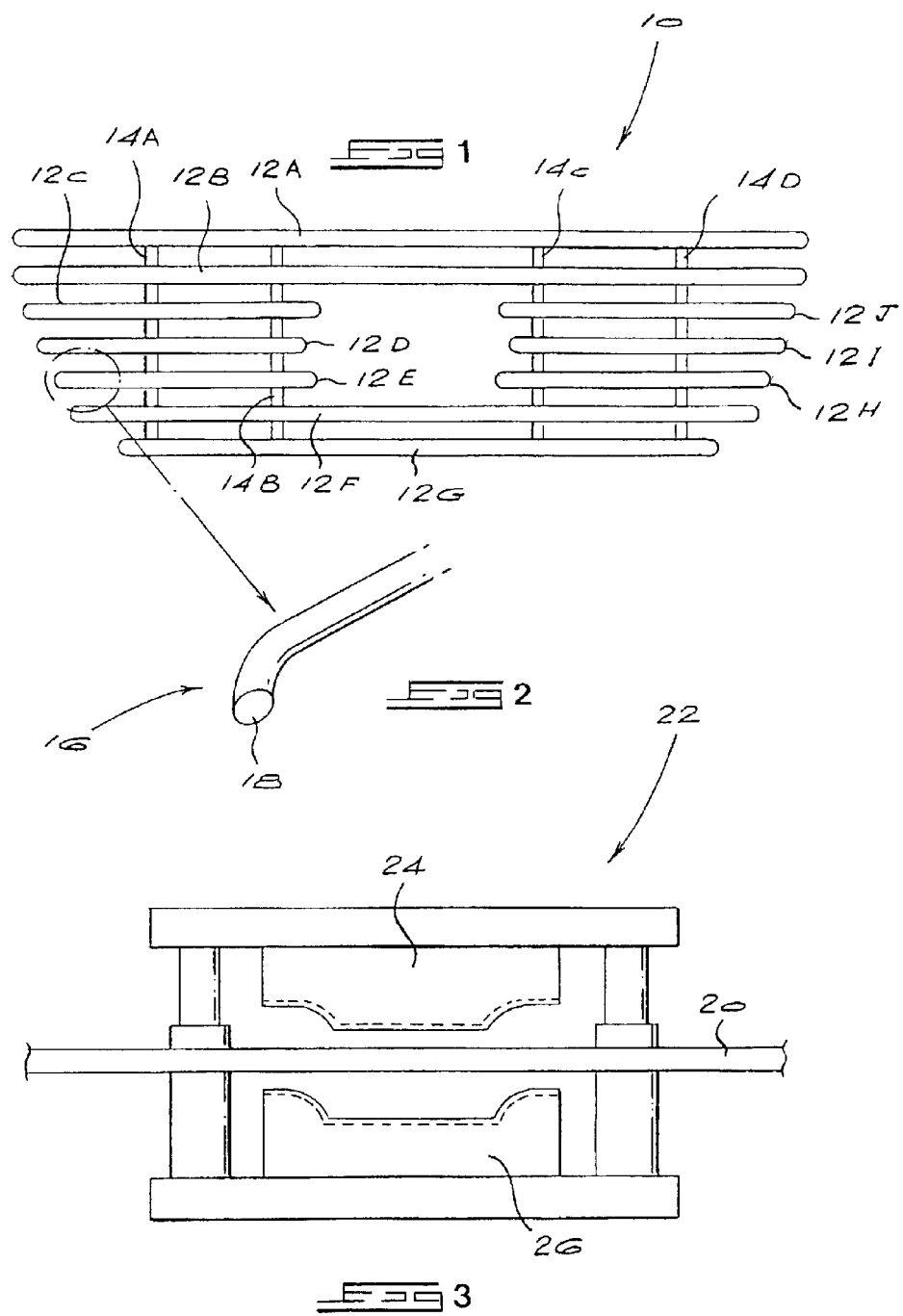

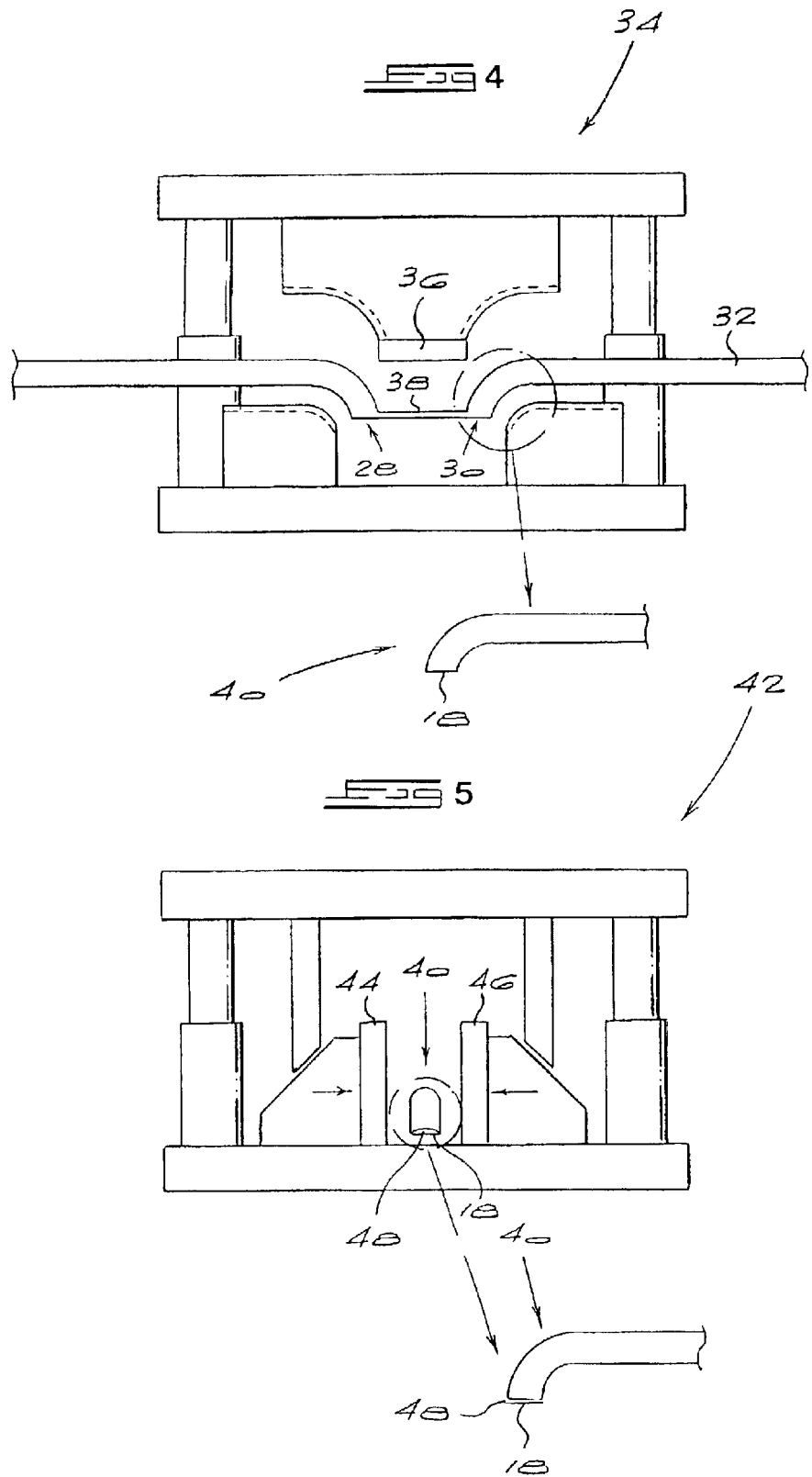

CAVITY FORMED TUBE FOR A GRILL GUARD

BACKGROUND OF THE INVENTION

This invention relates to a grill guard for the grill of a motor vehicle, and in particular to a cavity formed tube for the grill guard and to a method of manufacturing this formed tube.

Grill guards typically comprise a plurality of horizontal round tubes that are joined together, with the grill guard then being fitted to a front end of the vehicle.

Typically, however, the ends of each tube are left unfinished and open-ended, so as to define circular apertures at each end. This structure is thus relatively unattractive, and the burred apertures are also potentially dangerous with a person's hand and/or clothing quite easily being caught on, and torn by, these ends.

It is therefore desirable to provide a grill guard that addresses the abovementioned problems.

SUMMARY OF THE INVENTION

According to a first aspect of the invention there is provided a cavity formed tube, the formed tube having a curved end that defines an end aperture, wherein the tube includes a cap member that is integral with the formed tube, the integral cap member being arranged to substantially cover the end aperture of the curved end of the tube.

Preferably, an opening is defined between the integral cap member and the tube.

Typically, the formed tube forms part of a grill guard for a motor vehicle, the grill guard comprising a plurality of formed tubes and connecting means for connecting together the plurality of formed tubes so as to define the grill guard.

According to a second aspect of the invention there is provided a method of manufacturing a cavity formed tube, the method comprising the steps of:
providing a tube;
pressing the tube so as to define a curved end; and
cropping the curved end so as to define a cap member that is integral with the formed tube, the integral cap member being arranged to substantially cover the curved end of the tube.

Preferably, the method further includes the step of pressing the curved end so as to define an opening therein.

According to a third aspect of the invention there is provided a grill guard for a motor vehicle, the grill guard comprising:
a plurality of tubes, each tube having a curved end that defines an end aperture, with each tube further including a cap member that is integral with the tube, wherein the integral cap member is arranged to substantially cover the end aperture of the curved end of the tube; and
connecting means for connecting together the plurality of formed tubes so as to define the grill guard.

Typically, an opening is defined between the integral cap member and the tube.

BRIEF DESCRIPTION OF THE DRAWINGS

FIG. 1 shows a front view of a grill guard comprising a plurality of formed tubes according to the invention;

FIG. 2 shows a close-up perspective view of an end of one of the formed tubes of the grill guard shown in FIG. 1;

FIG. 3 shows a front view of a pressing tool that is used in the manufacturing of the formed tube of the invention;

FIG. 4 shows a front view of a cropping tool that is used in the manufacturing of the formed tube of the invention; and FIG. 5 shows a side view of a further pressing tool that is used to finalise the formed tube of the invention.

DESCRIPTION OF AN EMBODIMENT

Referring to FIGS. 1 and 2, a grill guard 10 for a motor vehicle comprises a plurality of horizontal formed tubes 12A to 12J and four vertically extending connecting members 14A to 14D for connecting together the plurality of tubes 12A to 12J so as to define the grill guard 10.

The end 16 of each formed tube 12A to 12J, as can be clearly seen in FIG. 2, is curved, and is provided with a cap member 18 that is integral with the formed tube. The cap member 18 serves to substantially cover the circular aperture at the curved end of the tube.

The manufacturing of the curved end of each formed tube will now be described with reference to FIGS. 3 to 5.

A stainless steel tube 20 is first provided, and is fed to a hydraulic pressing tool 22. The pressing tool 22 comprises a pair of complemental pressing plates 24 and 26 that are arranged to press and flatten the formed tube 20 so as to define a pair of curved ends 28 and 30. The resulting, flattened tube 32 is shown in FIG. 4, with the curved ends 28 and 30 being clearly shown. The radius of curvature of each curved end 28 and 30 is in the region of 1¼ inch (31.75 mm).

The tube 32 is then mounted to a hydraulic cropping machine 34. The cropping machine 34 comprises a cutting element 36 that is arranged to sever the curved ends 28 and 30 of the formed tube 32 from the flattened portion 38. This cropping process results in a curved end that defines the cap member 18 that is integral with the formed tube 32, for substantially covering the curved end of the formed tube.

The resulting covered, curved end 40 of the formed tube 32 is then fitted to a further pressing tool 42. The tool 42 comprises a pair of pressing plates 44 and 46 that press the sides of the curved end 40 so as to force the integral cap member 18 away slightly from the curved end 40, thereby defining an opening 48. The opening 48 assists in electro-polishing the formed tube 32, with, in particular, the opening 48 allowing solvent to flow through the tube 32 during the electro-polishing process.

The present invention thus provides a formed tube having a curved end that includes an integral cap member, which can be used to form a far more attractive and safer grill guard.

I claim:

1. A cavity formed tube, the formed tube having a curved end that defines an end aperture, wherein the tube includes a cap member that is integral with the formed tube, the integral cap member being arranged to substantially cover the end aperture of the curved end of the tube and to define an opening between the intergral cap member and the tube.

2. A cavity formed tube according to claim 1, wherein the formed tube forms part of a grill guard for a motor vehicle, the grill guard comprising a plurality of formed tubes and connecting means for connecting together the plurality of formed tubes so as to define the grill guard.

* * * * *